Dec. 26, 1944. H. E. OLSON 2,365,771
WHEEL PULLER
Filed May 14, 1942 2 Sheets-Sheet 1
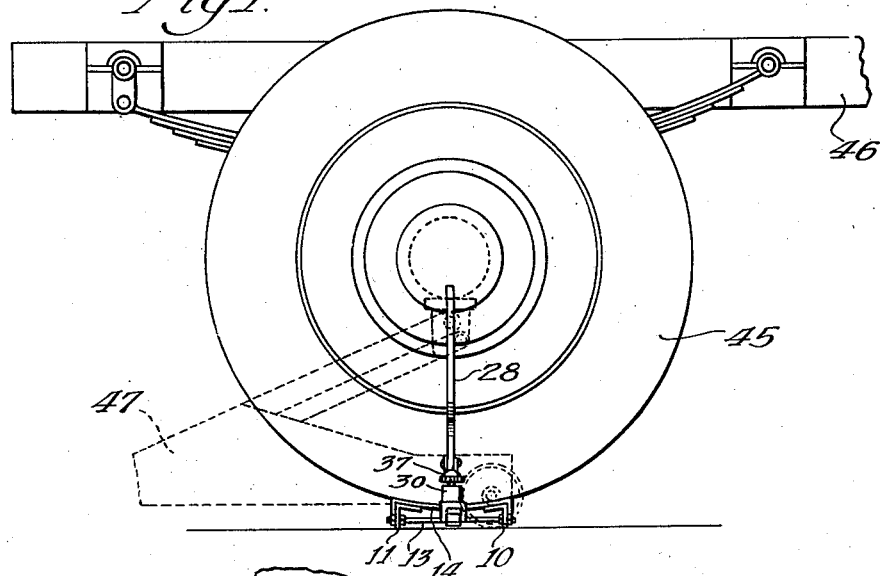
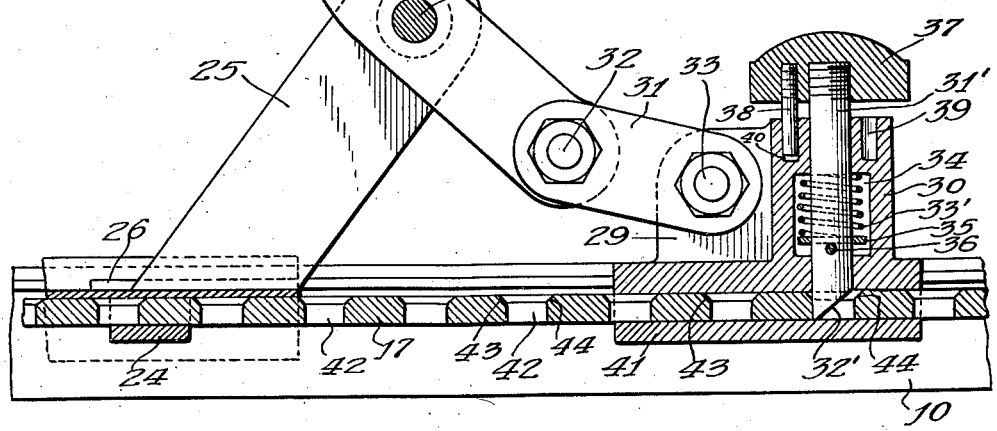
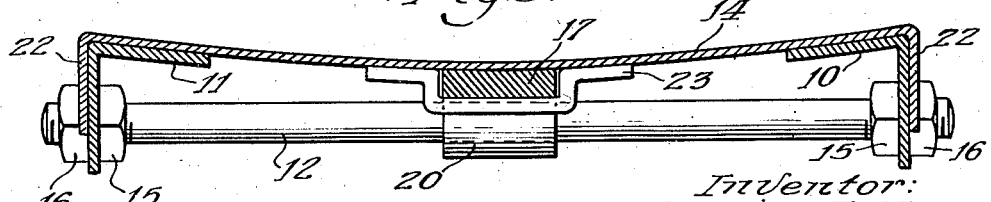
Inventor:
Henning E. Olson
By: Lee J. Gary
Attorney

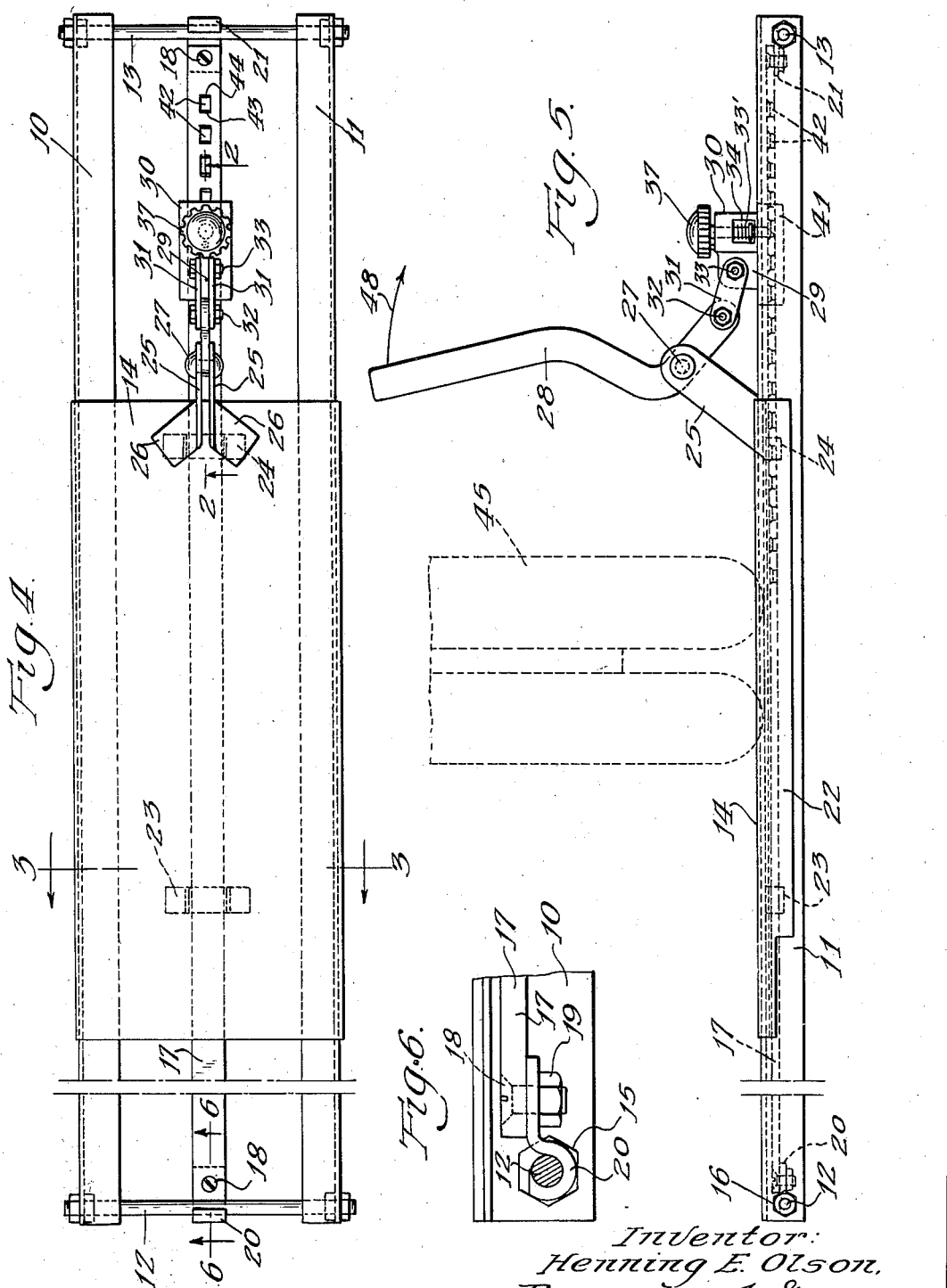

Patented Dec. 26, 1944

2,365,771

UNITED STATES PATENT OFFICE 2,365,771

WHEEL PULLER

Henning E. Olson, Brookfield, Ill., assignor to Bear Manufacturing Company, Rock Island, Ill., a corporation of Delaware Application May 14, 1942, Serial No. 442,917

7 Claims. (Cl. 214—1)

This invention relates to an improved device for facilitating the removal of a heavy wheel from the axle of a vehicle and for the replacement thereof in a similar manner, and more particularly to a wheel pulling apparatus employing a mechanical advantage factor.

The removal and replacement of wheels, particularly dual wheels of trucks, tractors, trailers and military vehicles which usually weigh several hundred pounds entails considerable difficulty. Among some of these difficulties may be noted the necessity for alignment of the wheel with the axle in mounting, the prevention of damage to the axle threads and surface in both mounting and removal of the heavy wheel, limited access to the wheel for removal thereof and excessive man power requirement, and particularly the necessity for carrying out the removal and remounting operations of such heavy wheels on the field away from hoist and tackle devices generally available in a shop or garage.

The use of so called "wheel removing devices" has heretofore been known, such prior devices generally comprising wheeled trucks adapted to support a wheel for replacement or removal thereof from a vehicle axle, the truck and supported wheel being required to be manually pushed or pulled, with considerable difficulty, to engage or disengage the wheel.

It is therefore an object of the present invention to provide a wheel mounting and removing device which employs the mechanical advantage of a lever, and by reason of the provision thereof may be actually termed a "wheel puller" since the device does more than act as a supporting carriage to facilitate handling but in addition permits the wheel in mounting thereof to be forced into proper position and seating on the axle, and in removal to forcibly withdraw it from the axle and to free it from any frozen or locked engagement therewith.

A further object is to provide a wheel removing or pulling device comprising a wheel support or carriage mounted on a fixed bed whereby the device may be successfully operated on uneven, rough or soft terrain which is of particular importance in the maintenance of military vehicles and other field operations, and the interengagement of the bed and carriage by means of a lever and ratchet means for carrying out a pulling and shifting movement of a heavy wheel.

Other objects relate to various economies of construction, structural details and arrangement of parts which will be apparent from a consideration of the following specification and drawings, wherein:

Fig. 1 is a diagrammatic side elevation of a portion of a vehicle and a wheel thereof and a rear end view of my wheel puller in operative association therewith.

Fig. 2 is an enlarged fragmentary longitudinal section of my device illustrating the lower end of the operating lever and its engagement to the carriage and to the ratcheting means, and is a section on the line 2—2 of Fig. 4.

Fig. 3 is an enlarged transverse section through the wheel carriage and side frame members, taken on the line 3—3 of Fig. 4.

Fig. 4 is a plan view of my wheel puller, and Fig. 5 is a side elevation thereof.

Fig. 6 is a sectional detail taken on the line 6—6 of Fig. 4.

Referring to the drawings, the reference numerals 10 and 11 indicate a pair of bars or rails maintained in parallel spaced apart relationship by the end tie rods 12 and 13 to form a track-way or bed, to support the carriage 14. The rails 10 and 11 may be of any suitable form but preferably are in the form of angle-irons as illustrated with their horizontal legs elevated and extending towards each other, these horizontal legs providing supporting surface for the carriage 14. When the surface of the carriage 14 is concave in transverse section, in the preferred illustrated form best shown in Fig. 3, the horizontal legs of the rails 10 and 11 may be bent downwardly to a slight degree to simulate such curvature and to better slidably support the carriage. Although the tie rods may be secured to the side rails in any conventional manner, as illustrated, the tie rods are each provided with threaded ends which extend through the vertical legs of the side rails and the side rails are maintained by the nut pairs 15 and 16, in parallel spaced apart relationship.

Extending centrally and longitudinally of the bed is the slotted bar 17, which for convenience in assembly, positioning and access to parts, is secured at each end by means of a screw 18 and nut 19 to the hangers 20 and 21 hung on the tie rods 12 and 13 respectively. As will be noted in the drawings, when use is made of a concave carriage 14, the elevation of the bar 17 is slightly lower than the top of the vertical legs of the side rails to accommodate and further support the carriage. The carriage 14 is provided with side flanges 22 extending downwardly over the side rails 10 and 11 to guide longitudinal movement of the carriage and prevent its lateral displacement. To additionally prevent lifting movement of the carriage in operation of the associated lever means, as hereinafter more fully set forth, the underside of the carriage is provided with sleeve strips 23 and 24 adjacent its ends in embracing engagement with the bar 17. The strips 23 and 24 may be in the form of a single elongated sleeve, or more than two such strips may be provided, and they may be secured to the carriage in any suitable manner, such as by welding.

The carriage 14 is provided at one end with a pair of upstanding rearwardly inclined parallel spaced arms 25, the arms being suitably secured, as by welding, to the upper surface of the carriage by means of the foot portions 26. Pivoted between the arms 25, by means of a rivet 27, is the operating lever 28, the upwardly extending long arm and hand grip portion thereof being offset to extend more nearly vertically and to be in a position conveniently accessible to the operator. The lower shorter arm portion of the lever 28 is articulated at its lower end to the lug 29 of the two direction standard ratcheting device 30 by means of the parallel spaced links 31, the links being pivotally joined to the end of the short lever arm at 32 and to the lug 29 at 33, by means of rivets or the cap screws and nuts illustrated, the links 31 being interposed to permit rectilinear movement of either the carriage 14 or the device 30 when the lever 28 is activated as hereinafter more fully set forth.

The two direction standard ratcheting device 30, which serves as an anchor during actuation of the lever 28 for movement of the carriage 14, is provided with a plunger pin or detent 31' extending through it vertically, the lower projecting end of the detent being provided with a single inclined face 32'. To urge the detent downwardly a spring 33' is trapped in the chamber 34 between the top thereof and the collar 35 and cotter pin 36 on the detent 31'. The upwardly extending end of the detent 31' is provided with the directional knob 37 from the under surface of which there projects a pin 38 adapted to seat in either of the sockets 39 or 40. These sockets 39 and 40 and cooperative pin 38 serve to limit the extent of downward movement of the detent 31' and to directionally position the inclined face 32' thereof. Thus engagement of the pin 38 in the socket 40, as illustrated, causes the inclined detent face 32' to extend rearwardly, and by lifting the knob 37 against the action of the spring 33' and rotating the knob 180 degrees to bring the pin 38 into seating engagement with the socket 39, the inclined face of the detent is caused to extend in a forward direction with respect to the wheel puller or towards the carriage 14.

The ratcheting device 30 is seated on and slidably engaged to the bar 17 by means of the sleeve base portion 41, and the tapered detent end 32' is adapted to be successively engaged in one of the plurality of slots 42 formed in the bar 17. These slots 42 which preferably extend through the bar 17 are provided on approximately the rearward half length thereof, and are preferably rectangular in cross-section so that the upper edges of each slot may be beveled to incline forwardly as at 43 and rearwardly as at 44. It will thus be evident that the provision of the spaced apart slots in the bar 17 cause it to assume the form of and to act as a ratchet, the portions between the slots 42 taking on the form in cross section of teeth.

In use of my device as a wheel puller, that is demounting a wheel from its vehicle axle, the carriage 14 is moved forwardly to adjacent the tie rod 12, the detent 31' being elevated during said movement, and thereafter the knob 37 is rotated so as to seat its pin 38 into the socket 40, the inclined face of the detent extending rearwardly and into a slot 42 remote from the rear end of the device or tie rod 13. As diagrammatically illustrated in Fig. 1, the wheel 45 of the vehicle 46 is elevated by means of a jack 47 after which the wheel puller frame and its carriage 14 is extended laterally under the wheel, after which the jack may be manipulated to permit the wheel to come into good frictional engagement with the carriage transversely thereof. Thereafter movement of the lever 28 in the direction of the arrow 48 shown in Fig. 5 pulls the wheel 45 from its axle by means of the great mechanical advantage of the lever, the linkage and lever arm arrangement being such as to permit movement about the distance between two slots 42. The lever 28 is then moved in the reverse direction whereupon camming action is brought about between the face 32' of the detent 31' and a beveled edge 44 of the slot in which the detent was extended, to cause the detent to be lifted and then depressed into an adjacent slot 42. These two operations may then be successively repeated to cause intermittent longitudinal movement of the carrier and the supported tire longitudinally of the bed rails. To remount the wheel the detent 31' is reversed by seating the pin 38 in the socket 39 and movement of the carriage and supported wheel is brought about by first moving the lever 28 in a direction opposite that of the arrow 48, the fulcrum device 30 being again intermittently shifted, this time by the camming action of the inclined detent face 32 against a beveled slot edge 43.

Although not shown in the drawings, a safety chain may be secured between the hand grip portions of lever 28 and the rivet 27 or the upper end of arms 25 to prevent upsetting of the short arm of the lever and links 31 beyond a common axis passing through rivets 27, 32 and 33, or in the alternative the same effect may be accomplished by providing a bridge across the upper edges of the arms 25.

From the foregoing it will be evident that I have provided a compact and efficient wheel pulling and moving apparatus employing the mechanical advantage of a lever in combination with ratchet means adapted to cause rectilinear movement between a carrier and a supporting bed therefor, and I do not therefore wish to be limited to all of the specific details of construction hereinbefore set forth for the purpose of illustration, except as set forth in the appended claims.

I claim as my invention:

1. A device of the class described comprising a carriage adapted to be moved on a guideway bed therefor, lever means pivotally engaged to said carriage and to spaced ratchet means operatively associated with said bed for causing said carriage to be shifted longitudinally on the bed, said ratchet means being reversible and engageable with a two-directional rack means on the bed.

2. A device of the class described comprising a carriage adapted to be moved on a guideway bed therefor, lever means pivotally engaged to said carriage and to spaced reversible ratchet means operatively associated with said bed and with two directional holding and upset means therefor on the bed for causing said carriage to be shifted longitudinally on the bed in either an intermittent forward direction or an intermittent rearward direction.

3. A device of the class described comprising a guideway bed, a carriage in association therewith adapted for guided longitudinal movement thereon, and an operating lever in pivotal engagement with said carriage and with a separately and alternately shiftable anchoring means on said bed for causing said carriage to be moved thereon, said anchoring means comprising a reversible ratchet detent and being engageable with two-directional engagement and upset means carried by said bed.

4. A device of the class described comprising a guideway bed, a carriage in engagement therewith adapted for longitudinal movement thereon, reversible ratchet detent means carried by said bed and engageable with complementary means thereon, and an operating lever pivotally engaged to said carriage and said ratchet detent means for causing said carriage to be shifted longitudinally on said bed.

5. A device of the class described comprising a guideway bed, a carriage in engagement therewith adapted for longitudinal movement thereon, reversible ratchet means carried by and engageable with means on said bed, and an operating lever pivotally engaged to said carriage and in pivotal linked engagement with said ratchet means for causing said carriage to be shifted longitudinally on said bed in either an intermittent forward direction or an intermittent rearward direction.

6. A device of the class described comprising a guideway bed, a carriage in association therewith adapted for guided longitudinal movement thereon, a lever in pivotal engagement with said carriage to provide a relatively long upwardly extending actuating arm and a downwardly extending relatively shorter arm, shiftable and variably engageable reversible anchor means carried by and engageable with complementary two-directional anchoring means on said bed, and link means extending between said short lever arm and said anchor means, actuation of the upwardly extending lever arm in one direction being adapted to cause said carriage to be shifted on said bed and actuation of said lever arm in the reverse direction being adapted to cause the engagement of said anchor means to be shifted and to thereby permit intermittent rectilinear movement of said carriage on said bed.

7. In a device of the class described, a bed comprising a pair of parallel spaced apart guideway rails and a parallel intermediately positioned strip provided with a plurality of spaced apart slots, a carriage on said bed adapted for guided longitudinal movement thereon, and a lever pivotally engaged to fixed arms extending from the face of said carriage to provide a relatively long upwardly extending actuating lever arm portion and a downwardly extending relatively shorter lever arm portion, anchor means carried by said slotted strip adapted for longitudinal movement thereon and comprising a detent adapted for variable engagement in said slots, and link means pivotally engaged to and extending between said anchor means and said short lever arm, swinging movement of said upwardly extending lever arm being adapted to successively cause said carriage to be moved to a limited degree on said bed and said anchor means in the same direction on said slotted strip by causing the detent thereof to be upset and anchored in the adjacent slot, and to thereby intermittently shift the carriage on the bed in a continuous direction.

HENNING E. OLSON.